United States Patent [19]

Poe

[11] Patent Number: 5,586,853
[45] Date of Patent: Dec. 24, 1996

[54] FASTENER CAGE FOR A PANEL

[75] Inventor: Charles A. Poe, Athens, Tenn.

[73] Assignee: Davidson Textron Inc., Dover, N.H.

[21] Appl. No.: 405,367

[22] Filed: Mar. 16, 1995

[51] Int. Cl.[6] .................................................. F16B 19/00
[52] U.S. Cl. ............................ 411/372; 411/373; 411/339
[58] Field of Search ..................................... 411/339, 372,
411/373, 377, 338, 508–510, 913; 52/704,
707; 24/297

[56] References Cited

U.S. PATENT DOCUMENTS

| | | | |
|---|---|---|---|
| 1,475,827 | 11/1923 | Hogarty | 411/339 |
| 2,181,740 | 11/1939 | Reiland | 52/704 |
| 3,096,678 | 7/1963 | Devine | 411/339 |
| 3,575,372 | 4/1971 | Emberson | 52/704 |
| 4,214,505 | 7/1980 | Aimar | 85/55 |
| 4,406,033 | 9/1983 | Chisholm | 411/373 |
| 4,717,301 | 1/1988 | Oddenino | 411/373 |
| 4,861,208 | 8/1989 | Boundy | 411/339 |
| 4,878,792 | 11/1989 | Frano | 411/339 |
| 5,069,586 | 12/1991 | Casey | 411/339 |
| 5,103,538 | 4/1992 | Ryder | 411/372 |

Primary Examiner—Steven N. Meyers
Assistant Examiner—Gary Estremsky
Attorney, Agent, or Firm—Reising, Ethington, Barnard & Perry

[57] ABSTRACT

A fastener cage for retaining a fastener on a panel comprises a retainer and a collar which sandwich a rigid substrate of the panel and snap-fit together in interconnecting relationship through a hole in the substrate. The retainer retains an anchoring end of the fastener and the collar and the retainer transmit pushing and pulling forces on the panel substrate through extensive areas of the respective inner and outer side of the substrate surrounding the hole. The retainer and collar are formed with a central opening for the insertion of the fastener and a thin inexpensive cover is adhered to the retainer to close the opening therein to prevent the entry of plastic foam that is formed against the inner side of the panel substrate.

9 Claims, 3 Drawing Sheets

5,586,853

FASTENER CAGE FOR A PANEL

TECHNICAL FIELD

This invention relates to fastener cages for retaining fasteners on a panel and more particularly to such fastener cages wherein plastic foam must be prevented from entering same while being formed against an inner side of the panel.

BACKGROUND OF THE INVENTION

Laminated automotive interior trim panels are constructed in a variety of ways including the separate molding of a glass fiber reinforced polyurethane substrate and an expanded vinyl skin with a layer of polyurethane foam later formed in place between the substrate and skin to complete the panel. And the panel may be attached to the interior of a motor vehicle in various ways including the use of a common type of molded plastic fastener that (1) is adapted to be readily and quickly inserted and then retained in a cage attached to the substrate, and (2) is adapted to then readily and quickly attach the panel to the sheet metal of the vehicle structure which may be the body or a door and by a pushing force on the outer side of the panel that forces the fastener into a self-retaining condition in an aperture in the sheet metal. The fastener cage is typically a molded plastic part or assembly and it is desirable that the cage also be adapted for easy and quick installation on the substrate and prior to the formation of the foam so as to permit the cage to be anchored to the substrate from the back side. However, the foam which is formed in place against the back side of the substrate can not be allowed to enter the cage as it would block later entry of the fastener. This presents a problem because the internal fastener capturing feature(s) of the cage normally require that there be a central opening through the cage to permit the molding of the cage interior. As a result, such fastener cages are normally designed with a special molded plastic cap that is attached to the cage on the back side of the substrate to prevent such foam entry as disclosed in U.S. Pat. No. 4,717,301.

As mentioned above, the panel is attached by pushing on the panel to force the above type fastener into an aperture in the vehicle body or door structure. The panel is also required to be able to be pulled to force the release of the fastener from the vehicle structure for service or replacement of the panel. In raising the standards of its products, a motor vehicle manufacturer may require that the panel be capable of many repeated installations and removals such as five or more that would not normally be experienced in actual use and this places an unusual amount of repeated pushing and pulling stress on the connection of the fastener cage with the panel. In designing the cage for quick and easy installation on the substrate and with a foam blocker such as a cap, it has been found that current fastener cages are typically better suited for transmitting forces between the fastener and the substrate in one direction as compared to the opposite direction and as a result, the cage can be torn away or separated from the substrate on many repeated test installations and removals where repeated stress is placed on the weakest link between the cage and the substrate. For example, the fastener cage in the above noted U.S. Pat. No. 4,717,301 is substantially more secure in its connection with the panel to pulling rather than pushing on the panel to secure and release the fastener with respect to the structure to which the panel is attached by the fastener. And as a result, the cage is likely to be eventually torn from the panel on repeated installations.

SUMMARY OF THE INVENTION

The present invention is in a molded plastic fastener cage that is easily and quickly attached to a panel structure against which foam is later formed, prevents entry of the foam during its formation in a very cost effective manner, and very effectively resists separation from the panel structure when pushing forces are applied to the panel structure to attach the panel in place with a fastener retained in the cage and when pulling forces are applied to the panel to remove the panel while the fastener remains anchored to the panel by the cage. This is accomplished with a molded plastic cage assembly comprising a retainer and a collar which sandwich a rigid supporting structure of the panel and snap-fit together in interconnecting relationship through a hole therein and wherein the retainer is inserted in the hole from the inner side of the rigid panel structure and the collar is located on the outer side.

The collar in one embodiment is adapted to be molded in place in the outer side of the rigid panel structure in permanent interlocking relationship for both enhanced attachment thereto and simplifying final assembly of the cage. In another embodiment, the collar is later added as a separable part to enable for example the use of interchangeable collars. In both embodiments, the retainer and collar co-operatively retain an anchoring end of the fastener and have extensive areas that transmit forces between the fastener and the panel through extensive annular portions on the inner and outer side of the panel immediately surrounding the fastener cage. The retainer and collar are formed with a central opening enabling the molding of the cage interior and for the insertion of the fastener and a cover which can simply be a piece of inexpensive masking tape is applied to the retainer to close the opening to the cage at this end to prevent the entry of the plastic foam that is formed against the inner side of the panel and over the retainer. It was discovered that a piece of masking tape or other thin piece of inexpensive foam impervious material could be used to close the opening to the cage on the inner side of the panel as the pressure developed in the typical foaming process does not exceed about 5 psi.

It is therefor an object of the present invention to provide a new and improved fastener cage for a panel having plastic foam formed against an inner side thereof and over the cage.

Another object is to provide a new and improved cage for caging a fastener to a panel wherein the cage sandwiches a rigid part of the panel over a wide area to transmits forces therebetween incurred during installation and removal of the panel.

Another object is to provide a fastener cage for a panel wherein the cage has a collar and a retainer that snap-fit together through an opening in a rigid part of the panel and the cage is closed at the retainer on the inner side of the panel by a piece of thin inexpensive material that is adhered to the retainer and prevents the entry of plastic foam formed against the inner side of the panel and over the cage.

Another object is to provide a fastener cage for a panel that comprises a pair of members that snapfit together through an opening in a rigid part of the panel and co-operatively retain the anchor end of a fastener and wherein a thin inexpensive cover is adhesively secured to one of the members of the cage to prevent the entry of plastic foam that is formed against the inner side of the panel.

Another object is to provide a new and improved fastener cage for an automotive interior trim panel and the like wherein the cage sandwiches a rigid part of the panel and plastic foam is formed against the inner side of the panel and is prevented from entering the cage by an inexpensive piece of thin material that closes an opening to the cage from the inner side of the panel.

These and other objects, advantages and features of the present invention will become more apparent from the following description and drawings wherein:

DETAILED DESCRIPTION OF THE DRAWINGS

Figure 1:
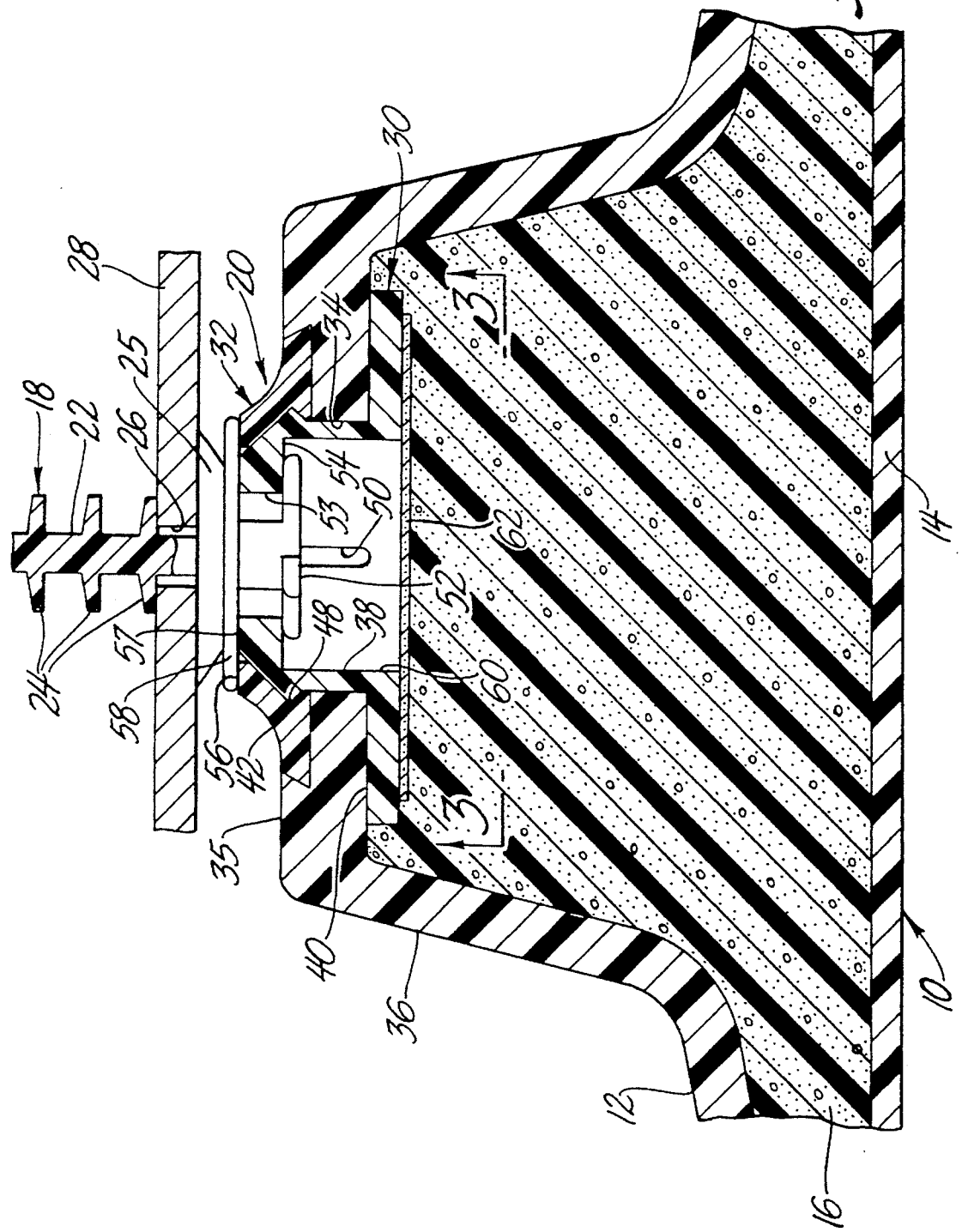
FIG. 1 is a cross-sectional view of a fastener cage according to the present invention installed in an automotive interior trim panel.

Referring to FIG. 1, there is illustrated an automotive interior trim panel 10 comprising a rigid substrate 12, a soft skin 14 and a layer of foam 16 therebetween. The substrate 12 is formed of glass fiber reinforced polyurethane (RPU), the skin 14 is formed of expanded vinyl, and the foam 16 is formed of polyurethane (PU) in a reaction process between the substrate and the skin in a conventional manner (i.e. polyol and isocyanate with water as a blowing agent).

The panel 10 is adapted to be attached to the interior of a motor vehicle passenger compartment by conventional fasteners, such as the fastener 18 illustrated, which are retained on the panel substrate 12 by individual cages 20 constructed according to the present invention (only one such fastener and cage being illustrated). The fastener 18 illustrated is like that disclosed in the above mentioned U.S. Pat. No. 4,717,301 which is hereby incorporated by reference and is just one of several various kinds that can be used. For example another kind of fastener that could be used and retained by the cage 20 is disclosed in U.S. Pat. No. 4,214,505 which is also hereby incorporated by reference. The fastener 18 is a plastic injection molded part of so-called "Christmas tree" design and is made of a tough thermoplastic material such as nylon. The fastener structure includes a trunk 22 with flexible limbs 24 that are adapted to be inserted into a hole 26 in a sheet metal section 28 of the vehicle structure which may for example be the body or a door depending on the particular trim panel. Adjacent ones of the fastener limbs 24 then sandwich the sheet metal section to capture the fastener and co-operate with a flexible collar 25 at the base of the trunk 22 to tightly attach the panel in place. The flexible fastener limbs 24 then also permit the panel to be removed by pulling or prying the panel away from the sheet metal.

Figure 2:
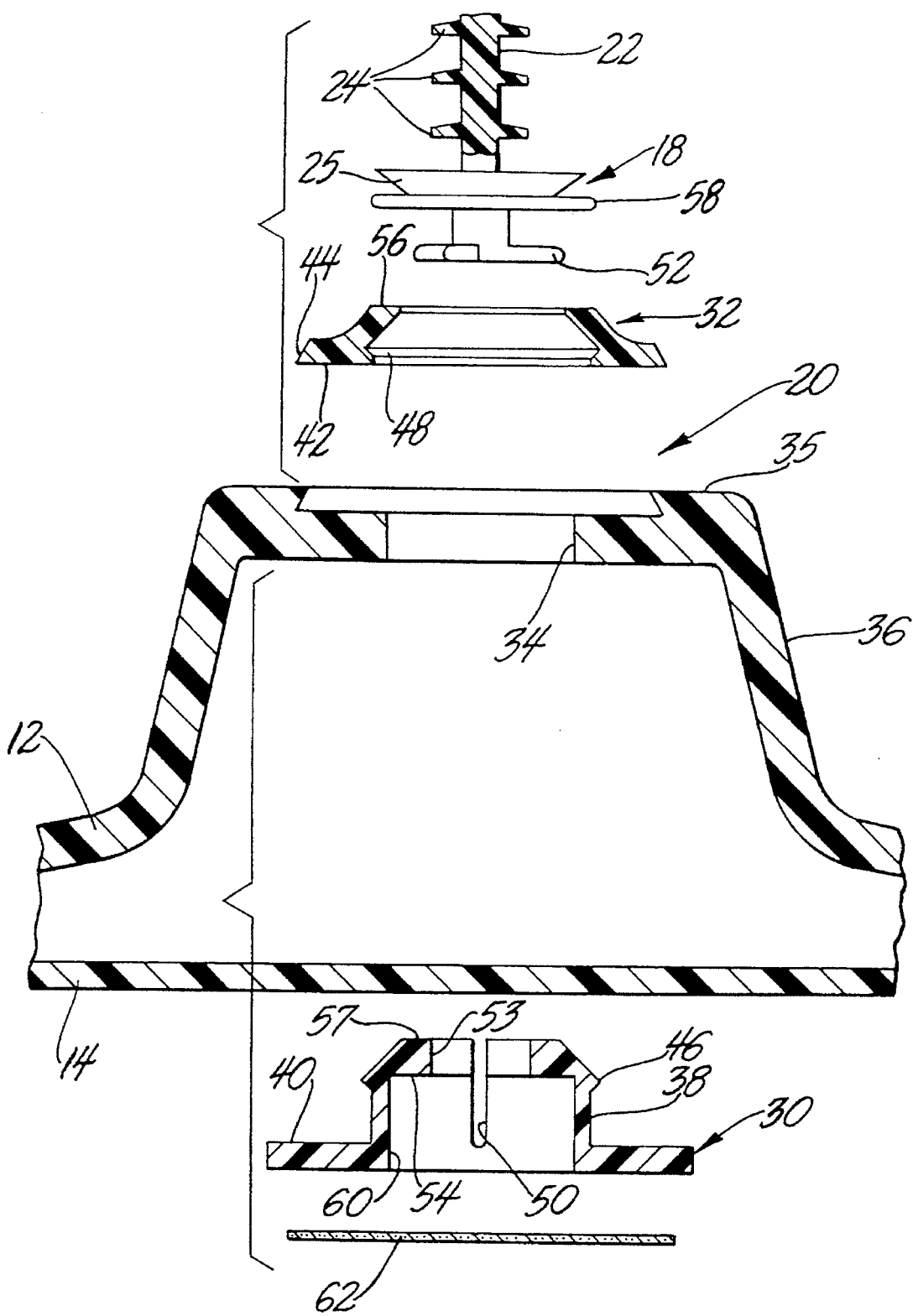
FIG. 2 is an exploded view of the fastener cage in FIG. 1.
Figure 3:
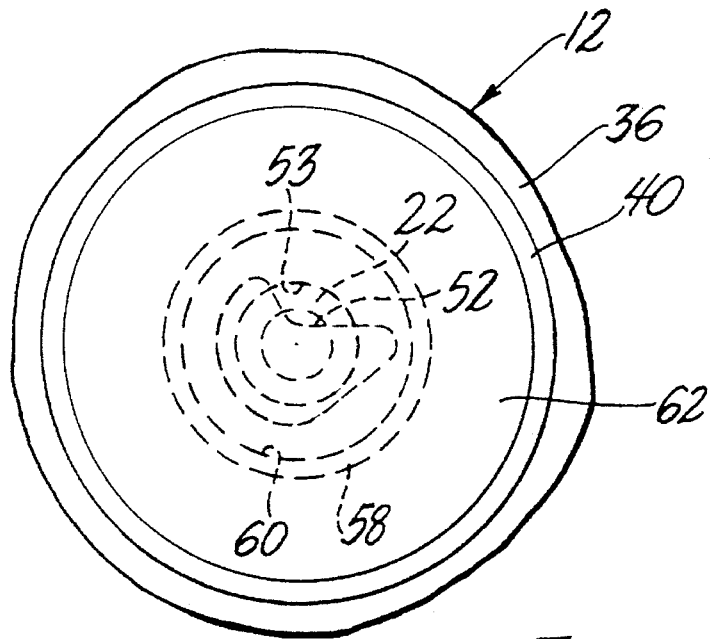
FIG. 3 is a view taken along the line 3—3 in FIG. 1 when looking in the direction of the arrows.

Referring to FIGS. 1, 2 and 3, the fastener cage 20 comprises an injection molded plastic retainer 30 and an injection molded plastic collar 32 that snap fit together in interlocking relationship through a hole or aperture 34 molded in the center of a flat wall section 35 of a mounting boss 36 that projects from the outer side and is molded integral with the substrate. The retainer and the collar are preferably formed of a tough thermoplastic material such as nylon. The assembly of the cage is made prior to the formation of the foam between the substrate and the skin, and in this embodiment the collar 32 is permanently attached to the boss 36 by being molded as an insert in the mold for the substrate as described in more detail below. The retainer 30 has a hollow neck or sleeve portion 38 that is received in the mounting hole 34 and an annular flange defining a radially outwardly extending annular shoulder 40 that contacts with an inner flat side of the substrate boss wall section 35 about this hole at the axially inner end of the retainer 30. The collar 32 receives the retainer neck 38 and has an annular shoulder 42 arranged in axially spaced facing relation to the shoulder 40 of the collar 32 and engaging the inner side surface of the substrate 12. The shoulder 42 includes a radially outwardly extending angled edge 44 that is molded in place as an insert in the outer side of the substrate boss wall section 35 about the mounting hole 34 to permanently interlock the collar and the substrate boss.

The retainer and collar are adapted to snap together in an interconnected or interlocked manner by the formation of an annular radially outwardly projecting angular rib 46 on the upper axially outer end of the retainer neck 38 that deflects inward with this end of the neck to be received in an annular groove 48 in the collar 32; the upper end of the neck and the central opening in the collar being tapered to facilitate this inward deflection of the neck. The inward deflection of the retainer neck at the rib 40 to enable the entry of the neck 38 into the collar and this snap fit is provided by one or more axial slots 50 formed in this end of the neck. This snap fit retains the cage parts together to secure them against relative axial movement and is not for the purpose of transmitting loads between the panel and the fastener during panel installation and removal as will be explained below.

The fastener 18 has an assembly end including a hook shaped, partially circular, assembly head 52 like in the above U.S. Pat. No. 4,717,301. The assembly head 52 is receivable at an angle through a central hole 53 provided in an annular formation at the axially outer end of the neck 38 past a radially inwardly extending annular shoulder 54 in the retainer neck at the lower inner side of this hole. Then on aligning the fastener axially, an annular shoulder 56 on the collar 32 together with a radially inwardly aligned shoulder 57 on the upper end of the retainer neck 38 at the upper side of the retainer hole 53 abuts in generally coplanar relation with a flexible annular assembly shoulder 58 on the assembly end of the fastener. The fastener shoulder 58 is spaced from the assembly head 52 of the fastener by a distance slightly larger than that between the internal retainer shoulders 54 and 57, and the fastener 18 is thus fully and snugly trapped in the cage 20 by the retainer at its shoulders 54 and 57 and is also trapped in the cage by the collar shoulder 56 and the retainer shoulder 54. It will also be understood that the assembly head of the fastener can have various forms other than the hook shaped head 52 and may for example have a full circular or annular sector shape, as disclosed in U.S. Pat. No. 4,214,505, which is receivable through the retainer hole 53 and then similarly trapped by the cage 20. It will also be understood that the fastener assembly shoulder 58 may be a separate annular formation on the assembly end of the fastener as illustrated and like that disclosed in U.S. Pat. No. 4,214,505 or it may be the bottom shoulder of a relatively large assembly collar on the assembly end of the fastener like in U.S. Pat. No. 4,717,301.

With the above described sandwiching arrangement of the collar and the retainer with respect to the substrate wall, a pushing force on the panel is transmitted to the fastener through the externally exposed collar shoulder 56 from the outer side of the substrate wall section 35 and a pulling force on the panel is transmitted to the fastener through the retainer shoulder 40 from the inner side of the substrate wall section 35 as will now be further described. With the fastener 18 trapped in the cage 20 by the internal retainer shoulders 54 and 57 and the collar shoulder 56, the panel 10 is attached to the sheet metal 28 by pushing on the panel 10 to force the fastener into anchoring engagement in the hole 26 in the sheet metal. And the panel is removed by pulling or prying the panel away from the sheet metal while the fastener remains trapped in the cage.

In the pushing and pulling on the panel for installation and removal, the resulting force from the fastener and acting on the panel substrate is by design intent through the annular shoulder 56 of the collar and the annular shoulder 54 of the retainer respectively and thereby through the respective other shoulder 42 and 40 of the collar and retainer that sandwich the substrate wall section 35 about the cage mounting hole 34 in the substrate. The retainer and collar shoulders 40 and 42 of the cage spread the retainer and collar load over an extensive area on the respective inner and outer side of the substrate wall section 35 and thereby minimize the unit loading on the substrate to effectively prevent the cage from tearing loose from the substrate in both the pushing and pulling direction. Where it is desired that this resistance to separation of the cage from the substrate be just sufficient and equal in both directions, the areas of the retainer shoulder 40 and the collar shoulder 42 pressing against the opposite sides of the substrate wall are made equal. For example, the collar shoulder 42 is illustrated as having a smaller diameter than the retainer shoulder 40 and either the diameter of the former could be increased or the diameter of the latter reduced so that their diameters and thus their load transmitting areas are made equal and provided of course that in either case the resulting and equal size load transmitting areas of the collar and retainer are large enough for the anticipated push and pull loading to prevent the cage from separating from the substrate.

It will be recalled that the substrate is formed in the illustrated embodiment with a thermoplastic material that is reinforced with glass fibers. In the molding of the substrate with such reinforcement material, there is a tendency for the fibers to not be evenly distributed immediately about the molded hole 34 and the spreading outward of the load over extensive or large areas of the substrate by the substrate sandwiching shoulders 40 and 42 of the retainer and collar of the cage assures that advantage is taken of the reinforcement fibers as well as a large area of the thermoplastic material to resist separation of the cage from the substrate (i.e. tearing of the cage out of hole 34 in the substrate).

Concerning now the formation of the foam with respect to the cage, the retainer 30 has a large central hole or opening 60 in its axially inner lower end that extends axially to the smaller diameter hold or opening shoulder 54 about the latter and the reception of the assembly head 52 of the fastener 18. And it will be recalled that the retainer 30 is assembled to the interior side of the substrate 12. The foam is prevented during its formation from entering the retainer and later interfering with the insertion of the fastener into the cage 20 in a simple, effective, low cost manner with a thin piece of foam impervious adhesive tape 62 of circular shape (see FIG. 3) that is applied to the axially inner side of the retainer shoulder 40 to cover the retainer hole 60 at this end. The tape may for example be conventional masking tape that is commercially available as the foam during its formation generates a pressure of only about 5 psi that must be resisted. A suitable cover can also be provided by applying an adhesive such as a gum based adhesive material to this end of the retainer and then applying a thin circular piece of foam impervious material such as paper, cloth or plastic over the adhesive to prevent the plastic foam from entering the fastener cage. Or the adhesive could be applied to the circular piece of paper, cloth or plastic rather than directly to the retainer shoulder 40. The covers may be mass produced at very low cost such as by stamping them from sheet stock.

Figure 4:
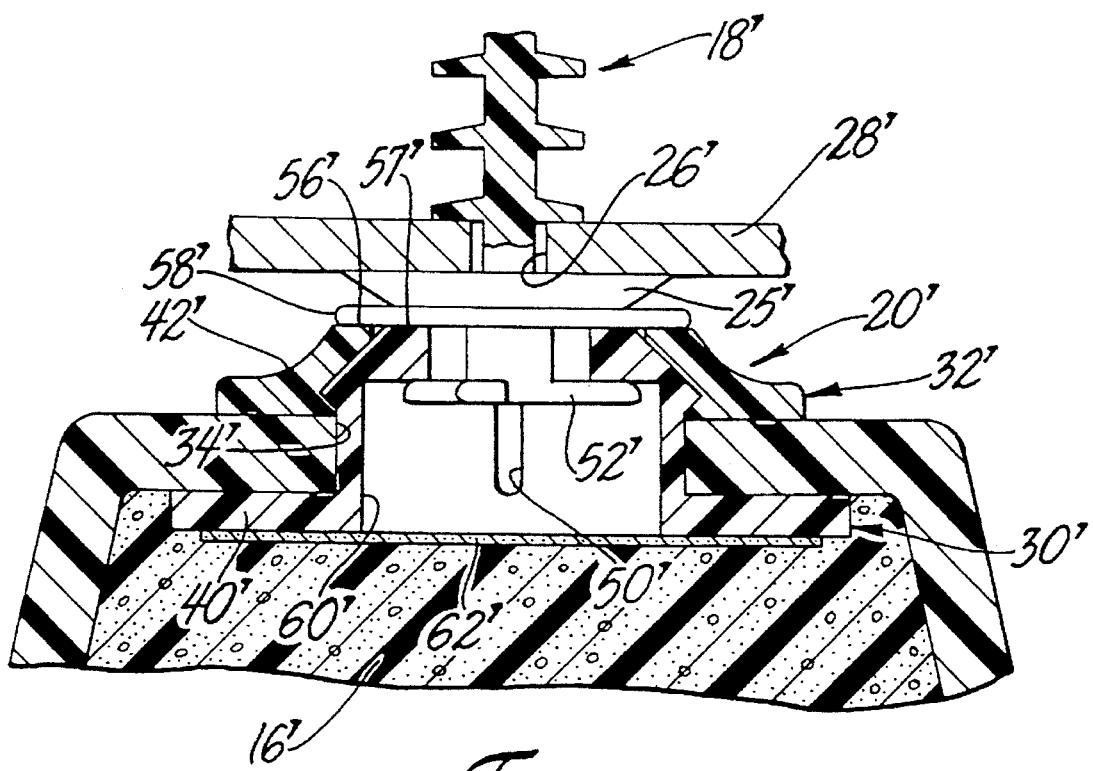
FIG. 4 is a cross-sectional view of another embodiment of the fastener cage.

The retainer of the cage may also be adapted to remain separate from the substrate as illustrated in FIG. 4 wherein parts similar to those in FIGS. 1–3 are identified by the same numbers only primed. In this arrangement, the collar shoulder 42' is formed without an anchoring edge and is not molded in place in the substrate and thus may be snap fitted to the retainer 30' either before or after the formation of the foam 16' which is prevented from entering the retainer by the cover 62'. This allows for interchangeability of different size and/or different configuration collars that may be better suited to a particular panel installation or location on the substrate.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. A molded plastic fastener cage for securing a fastener in an aperture formed in a rigid panel structure having opposed inner and outer side surfaces, said cage comprising:

a molded plastic collar having a central opening extending through said collar between opposite axial ends thereof and registerable with the aperture in the panel structure, a first annular shoulder surrounding said opening at one of said axial ends of said collar and engagable with the outer side of the panel structure about the aperture, and a second annular shoulder surrounding said opening at the other of said axial ends of said collar facing away and spaced axially from said first shoulder so as to be exposed on the exterior side of the panel structure for engagement by an assembly end of the fastener to transmit compressive pushing loads applied to the fastener during installation of the panel structure through said collar to the outer side surface of the panel structure lying beneath said first annular shoulder;

a molded plastic retainer formed separately from said collar having a sleeve portion extending between opposite inner and outer axial ends of said retainer and defining a central axial opening of said retainer extending between said ends thereof, said outer end of said sleeve portion being dimensioned for extension through the aperture of the panel structure and into said opening of said collar, said retainer and said collar including snap together connecting structure mutually engagable with one another upon the extension of said sleeve portion into said collar to secure said retainer attached to said collar, said retainer including an annular formation at said outer axial end of said sleeve portion defining first an second annular shoulders extending radially inwardly of said collar in axially spaced oppositely facing relation to one another for capturing an assembly end of the fastener, said retainer including an annular flange at said inner axial end of said sleeve portion defining a third annular shoulder extending radially outwardly of said sleeve portion disposed in axially spaced facing relation to said first shoulder of said collar for engaging the inner side surface of the panel structure thereby to mount said cage within the aperture of the panel structure, said third annular shoulder cooperating with one of said first and second shoulders of said retainer to transmit extensive pulling loads applied to the fastener during dismounting of the panel structure through said retainer and to the inner surface of the panel structure lying beneath said third shoulder of said retainer; and a foam-impervious cover member adhered to said axially inner end of said retainer and extending across said opening of said retainer sealing off said retainer opening to prevent the entry of foam material into said retainer opening during formation of a plastic foam layer against the inner side of the panel structure.

2. A molded plastic fastener cage as defined in claim 1, wherein said second annular shoulder on said collar includes a radially outwardly extending angled edge moldable in place in the outer side of the panel structure to permanently interlock said collar to the panel substrate.

3. A molded plastic fastener cage as defined in claim 1 wherein said snap together connection of said collar and said retainer supports said collar in separable relation to the panel structure.

4. A molded plastic fastener cage as defined in claim 1 wherein said second annular shoulder on said collar is disposed radially outwardly of said first and second shoulder on said retainer.

5. A molded plastic fastener cage as defined in claim 1 wherein said axially outer end of said sleeve portion includes at least one axially extending slot enabling said axially outer end to deflect radially inwardly, and said snap together connecting structure comprising an outer annular rib formed on said axially outer end of said sleeve section and an inner annular groove formed in said central opening of said collar seating said rib of said sleeve and securing said retainer against axial displacement relative to said collar.

6. A molded plastic fastener cage as defined in claim 1 wherein said second annular shoulder on said collar is disposed radially outwardly of said first and second shoulders on said retainer, said sleeve portion of said retainer being deflectable radially inwardly of said collar, said snap together connection comprising an outer annular rib formed on said sleeve and an inner annular groove formed in said collar and seating said rib.

7. A molded plastic fastener cage as defined in claim 6 wherein said second annular shoulder on said collar includes a radially outwardly extending angled edge insert-moldable in place in the outer side of the panel structure to provide a permanent interlocked connection therewith.

8. A molded plastic fastener cage as defined in claim 6 wherein said collar is supported by said retainer in separable relation to the panel structure.

9. A molded plastic fastener cage as defined in claim 6 wherein said cover comprises a thin flat piece of foam-impervious material having a generally circular shape.

* * * * *